(12) United States Patent
Nakamura

(10) Patent No.: US 8,171,185 B2
(45) Date of Patent: May 1, 2012

(54) ELECTRONIC DEVICE AND COMMUNICATION METHOD

(75) Inventor: Toru Nakamura, Setagaya-ku (JP)

(73) Assignee: Texas Instruments Incorporated, Dallas, TX (US)

( * ) Notice: Subject to any disclaimer, the term of this patent is extended or adjusted under 35 U.S.C. 154(b) by 50 days.

(21) Appl. No.: 12/627,584

(22) Filed: Nov. 30, 2009

(65) Prior Publication Data

US 2010/0217893 A1  Aug. 26, 2010

(30) Foreign Application Priority Data

Nov. 28, 2008  (JP) .................................. 2008-303736

(51) Int. Cl.
*G06F 13/00* (2006.01)
*G06F 3/00* (2006.01)
(52) U.S. Cl. ............................ 710/33; 710/10; 710/20
(58) Field of Classification Search ...................... 710/10
See application file for complete search history.

(56) References Cited

U.S. PATENT DOCUMENTS

| | | | |
|---|---|---|---|
| 6,553,415 B1* | 4/2003 | Manwiller | 709/222 |
| 7,020,729 B2* | 3/2006 | Taborek et al. | 710/305 |
| 7,272,679 B2* | 9/2007 | Taborek et al. | 710/305 |
| 7,334,075 B2* | 2/2008 | Marushak et al. | 710/316 |
| 7,568,059 B2* | 7/2009 | Solomon et al. | 710/105 |
| 7,747,793 B1* | 6/2010 | Black et al. | 710/52 |
| 2006/0271722 A1* | 11/2006 | Marushak et al. | 710/316 |

FOREIGN PATENT DOCUMENTS

JP  2000-174786  6/2000

* cited by examiner

*Primary Examiner* — Chun-Kuan Lee
*Assistant Examiner* — Ronald Modo
(74) *Attorney, Agent, or Firm* — Robert D. Marshall, Jr.; W. James Brady; Frederick J. Telecky, Jr.

(57) ABSTRACT

This invention provides an electronic device that can suppress the undesired influence of signals flowing on the bus as interference on devices connected to the bus. The electronic device has two ports connected to the bus with corresponding physical layer processing means. The physical layer processing means may optionally be connected together permitting separate connection to separate busses. Thus a bus reset on first bus will not interfere with processing on the second bus.

3 Claims, 8 Drawing Sheets

ELECTRONIC DEVICE AND COMMUNICATION METHOD

CLAIM OF PRIORITY

This application claims priority under 35 U.S.C. 119(a) to Japanese Patent Application No. 2008-303736 filed Nov. 28, 2008.

TECHNICAL FIELD OF THE INVENTION

The technical field of this invention is an electronic device and a communication method for data transmission using the functions of physical layers and link layers.

BACKGROUND OF THE INVENTION

The IEEE 1394 standard defines an interface for performing high speed serial communication among computers, peripheral devices, digital cameras and other electronic devices that handle multimedia information of moving pictures, still pictures, sound and character data, etc. IEEE 1394 systems having transmission speeds of 100 Mbps, 200 Mbps, 400 Mbps and 800 Mbps have been adopted in practical applications. Even higher speeds are envisioned. This communication system uses a 6-core cable including the power supply wires and allows the connection of up to 63 devices as nodes. The length of the cable between nodes is up to 4.5 m. The longest distance between nodes is 72 m. According to the IEEE 1394 standard, isochronous data transfer is defined as synchronous communication, while asynchronous data transfer is defined as non-synchronous communication.

The IEEE 1394 standard allows hot swaps. Another node may be pulled off or inserted during data stream transfer. The power supply of another node may be turned on or off even during operation.

When the number of nodes connected to the bus of an IEEE1 394 system increases or decreases during data transfer, if these nodes are different than the data transfer nodes, they have no direct influence on the data transfer.

According to the IEEE 1394 standard, a bus reset signal is generated when the number of nodes increases or decreases. Upon bus reset, all of the nodes on the bus output ID information known as self ID packets. Thus all of the nodes on the bus obtain information about all of the other nodes.

Data transfer in the IEEE 1394 standard uses the iso stream of isochronous communication. The self ID packet output due to a bus reset does not hinder the iso packet according to the standard. In the IEEE 1394 standard a bus reset does not directly influence data transfer.

Digital data transfer such as between DTV (Digital Television) and a peripheral recorder requires content protection. The prior art content protection includes the DTCP (Digital Transmission Content Protection). According to the DTCP protocol, the data sender (source node) and the data receiver (target node) exchange an encryption key after identifying the counterpart according to an AKE (Authentication ad Key Exchange) protocol. After encryption at the source node, the data transfers on the IEEE 1394 bus. The target node decodes the received data using the key exchanged by the AKE.

When a bus reset occurs due to the removal or insertion of a node or an increase or decrease in the number of nodes by turning on or off of the power supply of a node, the prior art requires re-exchange of the encryption key by AKE for the data being transferred on the bus.

When an increase or decrease in the number of nodes occurs due to the turning on or off of the power supply or a node and if the added or deleted node is a computer or other device with high bus management ability, the node performs bus management. This requires plural bus reset cycles. In this case, a bus reset is performed for changing the parameters of the bus, such as the gap count, etc. In addition, a high bus management node optimizes the bus state of nodes when the number of nodes changes to fit the state assumed by it. This requires plural bus reset cycles.

A bus reset might occur mid-way during AKE upon an increase or decrease in the number of nodes during content protected data transfer. Because AKE is restarted due to bus reset, processing takes a relatively long time. If plural bus reset cycles take place consecutively, AKE is repeatedly stopped and restarted for a few cycles. Because of the effective period during which the encryption key is exchanged according to AKE, when the off timing of the effective period and the timing of interrupt/restart of AKE are superimposed, the target node cannot ensure the encryption key. In this case decoding becomes impossible. This result is undesirable.

When a bus reset occurs, it is necessary to determine the node types. Consequently, the reading of the configuration ROM takes place simultaneously with communication to check the status. Thus after the bus reset, the traffic on the bus rises dramatically. This places a long term heavy load on the CPU of each node. Due to these factors, bus reset during data transfer is often a problem. Thus there is a demand for a scheme to avoid this problem.

When the number of nodes connected to the bus increases or decreases, the bus reset signals the node increase or decrease to the other nodes. Thus it is necessary to systematically guarantee the bus reset in the IEEE 1394 standard.

SUMMARY OF THE INVENTION

This invention is solves these problems of the prior art via an electronic device and communication method which suppresses the undesired interference to the devices connected to the bus on the bus caused by signals flowing on the bus.

This invention provides an electronic device where: the electronic device communicates via a bus and includes: a first port; a second port; a first physical layer processing means the physical layer for the data input/output via said first port; and a second physical layer means processing the physical layer for the data input/output via said second port; a first link layer processing means; a second link layer processing means; and a control means that controls the first and second physical layer processing and the first and second link layer processing means. The control means selects the following modes: a first mode in which the first physical layer processing means and the second physical layer processing means are connected via a first communication line, and the first port, the first physical layer processing means, the second physical layer processing means and the second port are made to operate as communication nodes belonging to the bus on the common protocol; and a second mode in which the first physical layer processing means and the second physical layer processing means are not connected to each other, the first physical layer processing means and the first link layer processing means operate as a communication node belonging to the bus on the first protocol, and the second physical layer processing means and the second link layer processing means operate as the communication node belonging to the bus on the second protocol.

In a first aspect of the electronic device of the present invention, the control means switches between the first mode and the second mode corresponding to the execution state of communication processing via a bus.

In a second aspect of the electronic device of the present invention, when the storage device storing data pertaining to the communication processing is connected to the side of the first port and another electronic device accessing the storage device is connected to the side of the second port, the control means selects the first mode when the communication processing is OFF and selects the second mode when the communication processing is ON.

In a third aspect of the electronic device of the present invention, the first mode has a third mode in which both the first link layer processing means and the second link layer processing means are OFF and a fourth mode in which only one of the first link layer processing means and the second link layer processing means is OFF. The control means selects either the third mode or the fourth mode.

In a fourth aspect of the electronic device of the present invention, the first and second link layer processing means inputs/outputs data pertaining to the link layer processing within said control means.

In a fifth aspect of the electronic device of the present invention, data input/output is performed via a second communication path between the first link layer processing means and the second link layer processing means.

In a sixth aspect of the electronic device of the present invention, the control means monitors the bus, and when there is an increase or decrease in the number of communication nodes connected to the bus, the control means outputs a bus reset signal and the identification data of the corresponding electronic device via the first port or the second port connected to said bus. Upon receiving the bus reset signal from another said electronic device, identification data is output to the bus via the first port or the second port that received the bus reset signal.

The present invention provides an electronic device which includes: a first port connected to a first serial communication line; a first physical layer connected to the first port; a first link layer connected to the first physical layer; a second port connected to a second serial communication line; a second physical layer connected to the second port; a second link layer connected to the second physical layer; a packet processing part connected to the first and second link layers; an internal communication line for connecting the first physical layer and the second physical layer; and a controller controlling connection of said internal communication line. The packet data input to the first node via the first serial communication line is output to the second serial communication line via the first node, the first physical layer, the internal communication line, the second physical layer and the second port. The first serial communication line and the second serial communication line operate as buses on the same protocol.

The present invention is a communication method which uses bus to communicate between plural electronic devices. This method includes the steps: a judgment step which determines whether the first physical layer processing means connected to the first port of a prescribed electronic device among plural electronic devices and the second physical layer processing means connected to the second port are connected via the first connecting line corresponding to the execution state of the communication processing via the bus in the prescribed electronic device; a first connection processing step which determines the connected state in the judgment step, the first physical layer processing means and the second physical layer processing means of the prescribed electronic device are connected via the first connecting line, and the first port, the first physical layer processing means, the second physical layer processing means, and the second port of the electronic device operate as the communication nodes belonging to the bus on the common protocol; and a second connection processing step which determines the connected state in the judgment step, the first physical layer processing means and the second physical layer processing means of the prescribed electronic device are not connected, the first physical layer processing means and the first link layer processing means of said electronic device operate as connected nodes belonging to the bus on the first protocol, and the second physical layer processing means and the second link layer processing means operates as communication nodes belonging to the bus on the second protocol.

BRIEF DESCRIPTION OF THE DRAWINGS

These and other aspects of this invention are illustrated in the drawings, in which.

DETAILED DESCRIPTION OF PREFERRED EMBODIMENTS

In the Figures: 10, 10a, 10b, 110, 110a and 110b are a bus; 16 and 18 are a port; 20 and 120 are a communication device; 22 and 24 are a PHY part; 32 and 34 are a LLC part; 40 is a packetizer; 42 is a stream I/F; 44 is an encryption part; 52 is a PHY bus; 54 is a LLC bus; 58 is a host I/F; 80 is a MPEG processor; 130 is a AV-HDD; 140 its a AV-HDD; 150 is a optical disk driver; 160 is a personal computer; 220 is a DTV, 240; 250 is an external device; and C101, C102, C103 and C104 are a IEEE 1394 cable.

The present invention provides an electronic device and a communication method that suppresses the undesired interference caused by the signals flowing on the bus hindering processing of other devices connected to the bus.

Figure 1:
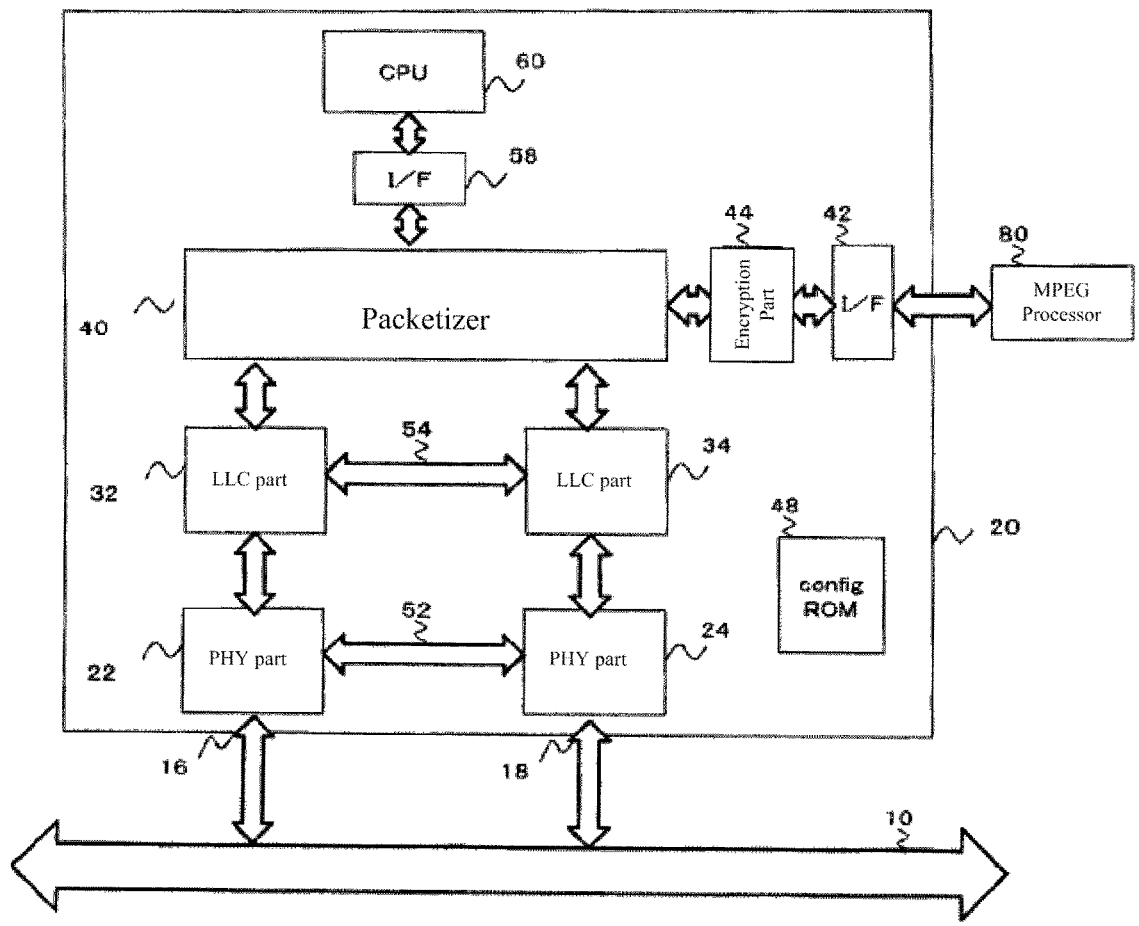
FIG. 1 is a block diagram of the communication device connected to the communication system in a first embodiment of the present invention.

FIG. 1 is a block diagram illustrating communication device 20 connected to the communication system in an embodiment of the present invention. Communication device 20 comprises: ports 16 and 18; PHY parts 22 and 24; LLC parts 32 and 34; packetizer 40; stream interface (I/F) 42; encryption part 44; configuration ROM 48; PHY bus 52; LLC bus 54; host interface (I/F) 58; and CPU 60.

Communication device 20 contains two groups of PHY parts that perform physical layer processing and LLC parts that perform target layer processing. Consequently, communication device 20 can support two buses simultaneously. When physically coupled to a first device via a first cable connected to port 16 and to a second device via a second cable connected to port 18, communication device 20 can selectively assume: a first state in which port 16 and port 18 are connected as the communication nodes to buses via different protocols; and a second state in which port 16 and port 18 are connected to the buses as communication nodes of the buses using the same protocol and communication is included between the first device and the second device.

FIG. 1 illustrates the bus connection on the protocol in said second state. In this example, PHY part 22 is an example of the first physical layer processing means and PHY part 24 is an example of the second physical layer processing means. LLC part 32 is an example of the second link layer processing means and CPU 60 is an example of the control means. The PHY connection mode is an example of the first mode of the present invention. The PHY unconnected mode is an example of the second mode.

PHY parts 22 and 24 are connected via respective ports 16 and 18 to bus 10 of IEEE 1394 system. PHY parts 22 and 24 perform electrical, mechanical, functional and procedural processes for establishing, maintaining and releasing the physical connection for performing bit transfer on bus 10 in the IEEE 1394 physical layer level. PHY parts 22 and 24 contain the driver/receiver the analog circuit. PHY parts 22 and 24 transmit signals to bus 10 and receive signals from bus 10. PHY parts 22 and 24 are connected via PHY bus 52. This connection between PHY parts 22 and 24 is under control of CPU 60.

PHY parts 22 and 24 are connected in the PHY connection mode and are not connected in the PHY unconnected mode. In the PHY connection mode, PHY parts 22 and 24 are connected permitting data transfer between them. In the PHY connection mode, PHY parts 22 and 24 operate as repeater PHY parts of one of two ports. In this case, bus 10 to which communication device 20 is connected operates as one bus.

PHY parts 22 and 24 are not connected in the PHY unconnected mode. Each of PHY parts 22 and 24 operates independently. In the PHY unconnected mode, PHY part 22 performs physical layer level processing for the data input via port 16 and outputs the data to LLC part 32. PHY part 22 inputs data from LLC part 32 and outputs data via port 16 to bus 10. PHY part 24 performs physical layer level processing of the data input via port 18 and outputs the data to LLC part 34. PHY part 24 inputs data input from LLC part 34 and outputs via port 18 to bus 10.

Figure 2:
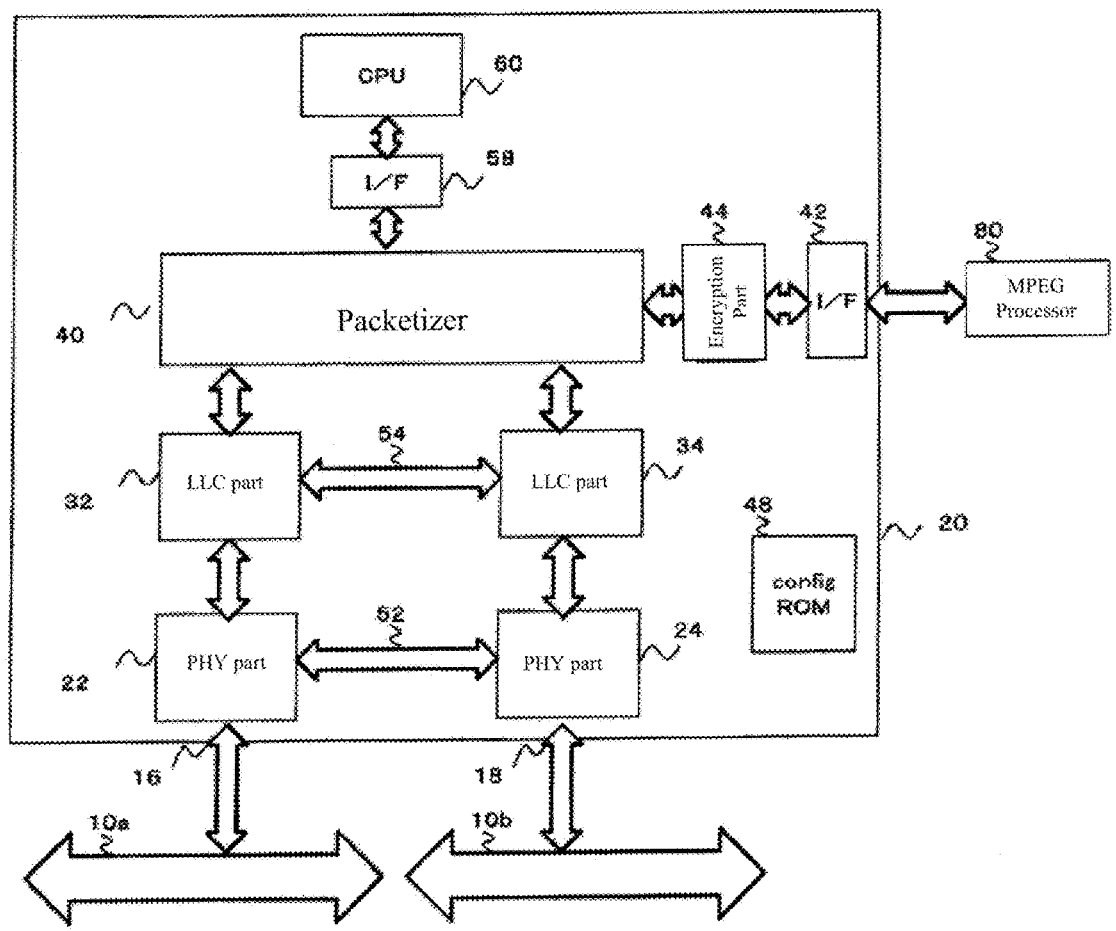
FIG. 2 is a block diagram illustrating a bus divided during operation in the communication device of FIG. 1.

FIG. 2 illustrates the PHY unconnected mode. Bus 10a using a first protocol is connected to port 16 and bus 10b using a second protocol is connected to port 18. Ports 16 and 19 operate independently as two buses according to IEEE 1394. CPU 60 sets PHY bus 52 in the unconnected state when it performs control and sets PHY bus 52 in the connected state when it does not perform control.

LLC parts 32 and 34 perform processing of the link layer level of IEEE 1394. LLC parts 32 and 34 are connected to packetizer 40. Upon receiving a request for service from the application program (application layer) executed by CPU 60, LLC parts 32 and 34 request service from PHY parts 22 and 24. LLC parts 32 and 34 refresh header information and perform other processes on the basis of the header information of the input packet. LLC parts 32 and 34 are connected via LLC bus 54. Under control from CPU 60, the connection between LLC parts 32 and 34 enters a connected state in the LLC connection mode and enters an unconnected state in the LLC unconnected mode.

LLC parts 32 and 34 are connected in the LLC connection mode. In this mode LLC parts 32 and 34 may perform mutual data transfer. When CPU 60 sets the PHY unconnected mode, PHY parts 22 and 24 each operate independently on buses 10a and 10b using two independent protocols. When it is necessary to communicate between the nodes on the two buses 10a and 10b, CPU 60 sets the LLC connection mode. This sets LLC parts 32 and 34 in the connected state via LLC bus 54 and enables a bridge operation. That bridge operation is performed between two buses on different protocols.

Buses 10a and 10b are independent of each other, so PHY parts 22 and 24 and LLC parts 32 and 34 should be independent. By placing LLC bus 54 in the connected state, it is possible to perform a data transfer between the node connected to bus 10a and the node connected to bus 10b. LLC parts 32 and 34 can perform a bridge operation between buses 10a and 10b by automatically re-attaching the header for transfer while the data payload in the packet is retained.

In the LLC unconnected mode, LLC parts 32 and 34 are in an unconnected state. LLC parts 32 and 34 then each operate as independent LLC parts.

Data transfer can be performed between LLC parts 32 and 34. LLC part 32 performs link layer processing for the data from packetizer 40, and outputs the data to PHY part 22. The data from PHY part 22 is subjected to link layer processing. The thus processed data is output to packetizer 40. LLC part 34 performs link layer processing for the data from packetizer 40 and outputs the processed data to PHY part 24. The data from PHY part 24 is subjected to link layer processing. The thus processed data is output to packetizer 40.

During asynchronous communication, CPU 60 sends and receives commands, etc. Packetizer 40 communicates with CPU 60 via host I/F 58. During isochronous communication, MPEG processor 80 produces an MPEG2 stream. Packetizer 40 is directly connected to MPEG processor 80 via stream I/F 42. The communication data is shaped by packetizer 40 to a form appropriate for the IEEE 1394 communication protocol such as EIA 61883.

The GUID of the node and other fixed data is stored in configuration ROM 48. This fixed data is stored in the configuration ROM of all of the nodes on bus 10.

A Configuration Status Register (CSR) (not shown in FIGS. 1 and 2) stores IRM (Isochronous Resource Manager), LRM (Link Resource Manager) and other attribute data (dedicated entry). CPU 60 controls the overall operation of communication device 20 on the basis of this attribute data.

Figure 3:
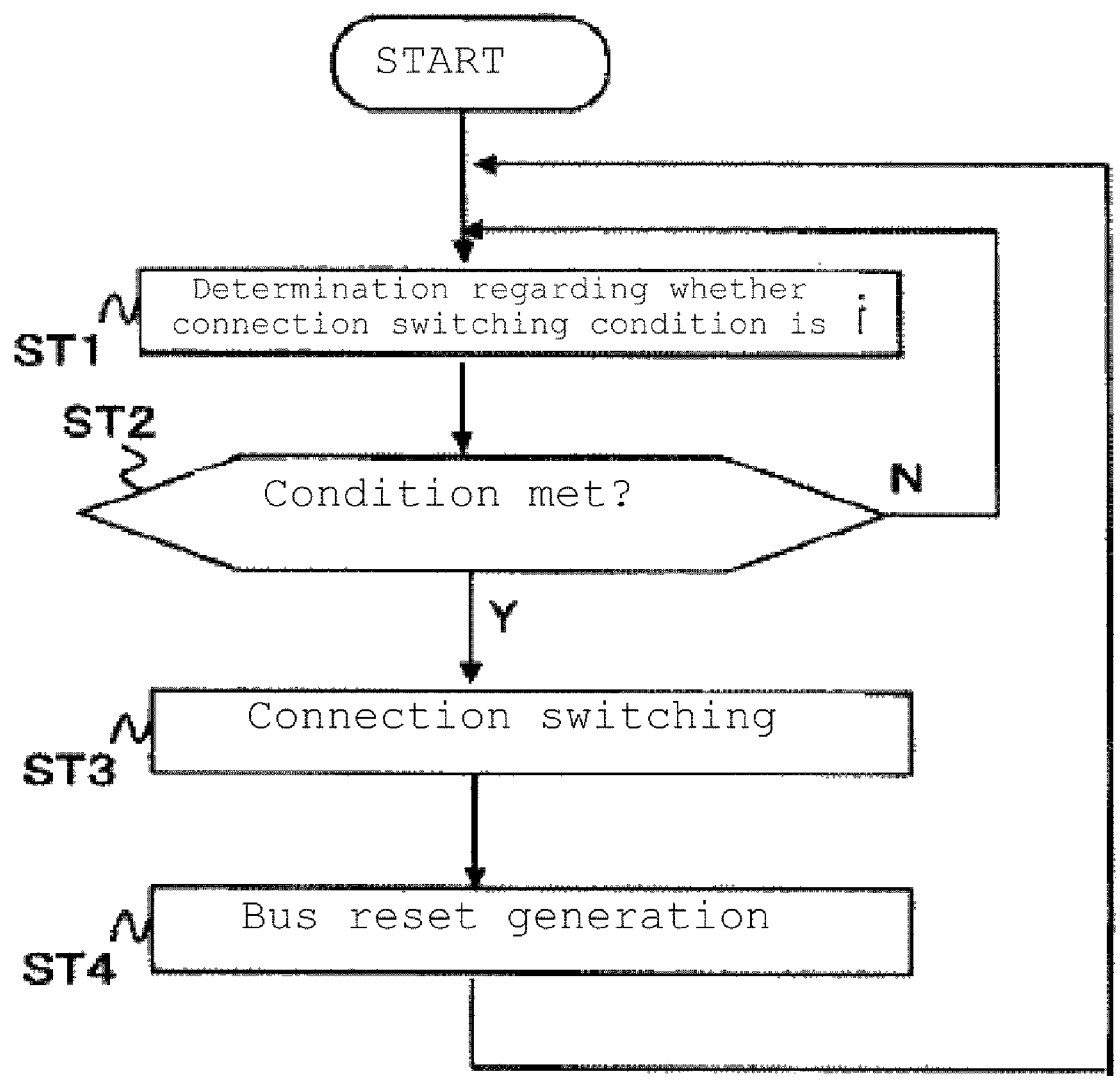
FIG. 3 is a flow chart illustrating the processing steps of CPU 60 of FIG. 1.

FIG. 3 is a flow chart illustrating the operation of CPU 60 as configured in FIG. 1. The operation starts at the START step. During step ST1 CPU 60 determines whether the switching condition of the connected state of PHY bus 52 and LLC bus 54 is met. When the communication processing that performs communication processing via MPEG bus is started by CPU 60 or MPEG processor 80, CPU 60 sets PHY bus 52 into the unconnected state is met. When the prescribed application is stopped by CPU 60 or MPEG processor 80, CPU 60 sets PHY bus 52 into unconnected state to the connected state. If the application program needs data transfer between buses 10a and 10b, LLC bus 54 is set into the connected state. When this application is turns OFF, LLC bus 54 is set into the non-connected state.

During step ST2 CPU 60 determines whether the switching condition of the connected state of PHY bus 52 and LLC bus 54 was determined in step ST1. If this is true, process control goes to step ST3. If this is not true, process control returns to step ST1.

In step ST3 following determination determines that the switching condition of step ST1 is met, CPU 60 switches to the connected state of PHY bus 52 and LLC bus 54.

In step ST4 CPU 60 executes the bus reset command. CPU 60 outputs the bus reset signal via port 16 or port 18 to buses 10, 10a and 10b. As a result, the nodes connected to buses 10, 10a and 10b perform the bus reset processing.

The following is explanation of operation examples of communication device 20.

OPERATION EXAMPLE 1

In this example, the IEEE 1394 bus operates as the bus via one protocol. CPU 60 has PHY parts 22 and 24 set in the PHY connection mode. With this setting, PHY parts 22 and 24 are in the connected state and data transfer between them is possible. CPU 60 sets LLC parts 32 and 34 in the OFF state. Communication device 20 operates as one node that performs a repeater operation from the other nodes connected to bus 10. Data input via port 16 to PHY part 22 are output via PHY part 22, PHY bus 52 and PHY part 24 from port 18. Data input via port 18 to PHY part 24 is output via PHY part 24, PHY bus 52 and PHY part 22 from port 16.

In Operation Example 1, the IEEE 1394 bus operates as bus 10 on one protocol. When a bus reset takes place with respect to bus 10 due to an increase or decrease in the number of nodes caused by removal or insertion or the turning ON or OFF of the power supply, all of the nodes on bus 10 output the self ID packet to bus 10. Thus all nodes connected to bus 10 obtain the most recent information from all nodes present on bus 10.

OPERATION EXAMPLE 2

In this example, the IEEE 1394 bus operates as two buses 10a and 10b on different protocols. CPU 60 sets PHY parts 22 and 24 into the PHY unconnected mode. With this setting, PHY parts 22 and 24 are in the unconnected state. No data transfer is performed between them. CPU 60 set LLC parts 32 and 34 in the ON state. Communication device 20 is recognized as a node from other nodes connected to bus 10a and is recognized as a node from other nodes connected to bus 10b.

Data input from bus 10a via port 16 to PHY part 22 is subjected to physical layer level processing by PHY part 22. This data is output to LLC part 32 and subjected to link layer level processing in LLC part 32. The data processed by LLC part 32 is output to packetizer 40. Packetizer 40 outputs the data input from LLC part 32 to CPU 60 via host I/F 58 and then to encryption part 44. Packetizer 40 outputs the processed data input from CPU 60 or encryption part 44 to LLC part 32. This data is subjected to link layer level processing by LLC part 32 and then output to PHY part 22. PHY part 22 performs physical layer level processing. This data is then output via port 16 to bus 10a.

Data input via port 18 from bus 10b to PHY part 24 is physical layer level processed by PHY part 24. This data is then output to LLC part 34. LLC part 34 performs link layer level processing. The data processed by LLC part 34 is output to packetizer 40. Packetizer 40 outputs the data input from LLC part 34 to CPU 60 via host I/F 58. This data is then output to encryption part 44.

Data processed by CPU 60 or encryption part 44 is input to packetizer 40 and then output to LLC part 34. LLC part 34 subjects this data to link layer level processing and outputs the data to PHY part 24. PHY part 24 performs physical layer level processing and outputs this data via port 18 to bus 10b.

In Operation Example 2, the bus of IEEE 1394 is divided into two buses, buses 10a and 10b, which use different protocols. When a bus reset occurs on bus 10a due to an increase or decrease in the number of nodes caused by removal or insertion of node or the turning ON or OFF of the power supply, the bus reset signal is transferred by only bus 10a and not by bus 10b. Bus reset processing is performed by nodes connected to bus 10a. No bus reset processing is not performed by nodes connected to bus 10b. Thus for nodes connected to bus 10b, when data are transferred in the AKE protocol, AKE is not interrupted by a bus reset on bus 10a.

In Operation Example 2, with LLC bus 54 set in the connected state, it is possible to perform information transfer (bridge operation) on the link layer level between the node connected to bus 10a and the node connected to bus 10b. LLC parts 32 and 34 can operate as a single LLC part.

When communication device 20 sets the connected state of PHY bus 52, the protocol bus with ports 16 and 18 of communication device 20 connected to it may operate as a single bus 10 or as two buses 10a and 10b. Communication device 20 divides the bus of IEEE 1394 into buses 10a and 10b by setting PHY bus 52 in the unconnected state. When buses 10a and 10b are separated, a bus reset occurring on one of buses 10a and 10b has no influence on data transferring on the other bus. This prevents an interruption in the processing of a protection data stream performed on the other bus.

When communication device 20 sets LLC bus 54 in the connected state it is possible to transfer information between the nodes connected to buses 10a and 10b. Communication device 20 performs a bridge operation. When required by information flowing between buses 10a and 10b, it is possible for them to work together as a single bus transferring only the necessary information. When PHY bus 52 is in the connected state, communication device 20 can operate as a single protocol bus 10. When a bus reset occurs, all of the nodes on bus 10 output the self ID packets onto bus 10. Thus all nodes on bus 10 obtain the most recent information concerning all other nodes. Assume when communication device 20 is in the sleep state or another state in which it does not perform the communication operation. Communication device 20 operates as a node on the bus, PHY bus 52 is set to the connected state and performs the repeater operation. This forms a bus using one protocol.

Embodiment 2

According to the IEEE 1394 standard, nodes connected to the bus are basically symmetric. This is not the node type that performs prescribed operation. When data transfer or other bus application is assigned between a DTV and a recorder, the function of the node is determined corresponding to the application scheme. When the application scheme of the bus is determined, the prescribed node performs the prescribed function corresponding to the application scheme. Depending on the application scheme of the bus, the prescribed node may keep managing the bus. For example, for a system in which DTV and a peripheral video recorder are connected by means of IEEE 1394 bus, usually the end user uses GUI of DTV to manipulate the device on the bus. In this case, having the DTV perform bus management is preferable in this case.

In this embodiment, plural LLC parts (links) are installed on the DTV that executes bus management. The communication bus is divided. Because of the plural divided buses connected to DTV, the DTV can acquire the information from all the nodes. Because the bus is divided, the nodes on each bus can obtain only the information from the bus to which it is connected. This poses no problems if the method using the bus for data transfer between DTV and the peripheral recorder is determined.

Suppose the bus is divided into two buses, the IEEE 1394 bus for the internal HDD of DTV and the bus for external expansion. Even when a bus reset occurs with respect to the bus for external expansion due to an increase or decrease in the number of nodes, the bus reset is not transferred on the IEEE 1394 bus for data transfer between the internal circuit of DTV and the internal HDD. This achieves stable bus operation.

When the data of the internal HDD is to be transferred to a recording device outside the DTV, the stream data flow must use the other bus. The data is relayed to the other bus without complicated processing that requires inclusion of software. This may be realized using the hardware of the LLC part that performs the bridge operation.

In the bridge operation, data is transferred among the plural LLC parts contained in the DTV. There is no need to perform data transfer between CPU, which performs upper DTV processing of the LLC part and the LLC part. In a sleep mode of CPU 60 in which the DTV application does not operate and the internal bus is used, the plural PHY parts are in the connected state performing a repeater operation, so that the system operates as a single bus. In this case, the plural PHY parts operate as a simple repeater, so that the internal HDD of DTV can be directly accessed from the external device.

Figure 4:
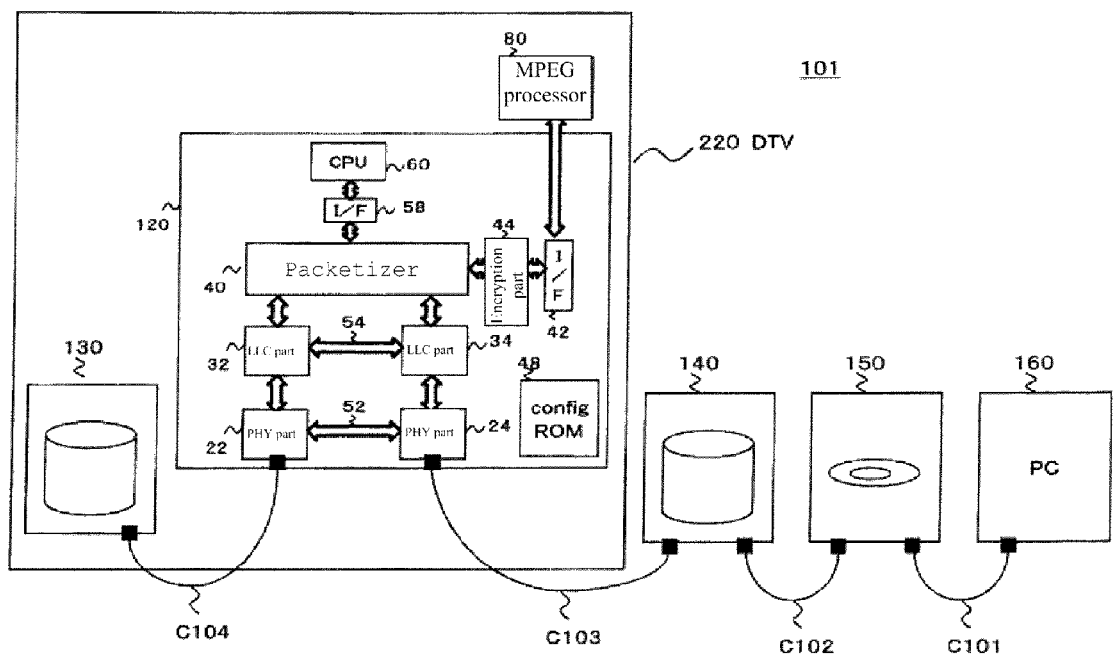
FIG. 4 is a block diagram of the physical connection configuration in the communication system in a second embodiment of the present invention.

FIG. 4 is a diagram illustrating communication system 101 operating according to Embodiment 2. FIG. 4 shows the physical connection relationship. Communication system 101 has DTV 220, AV-HDD 140, optical disk driver 150 and personal computer 160. They are mutually connected by means of cables C101, C102, C103 and C104. Cable C104 is an internal connection cable (wiring) in DTV 220. Cables C101, C102 and C103 are externally attached cables according to IEEE 1394.

DTV 220 includes DTV functional part 120 and AV-HDD 130. DTV functional part 120 inputs or outputs an MPEG data stream or other communication data from MPEG processor 80. MPEG processor 80 is connected to the stream port of DTV functional part 120. The data generated in MPEG processor 80 are output from said stream port via stream I/F 42 to encryption part 44. After encryption by encryption part 44, the data is output to packetizer 40. The encrypted data from encryption part 44 is packetized by packetizer 40. These packets are handled as the ISO packet on the bus of IEEE 1394.

CPU 60 is connected via host I/F 58 to packetizer 40 and outputs control commands to packetizer 40. These control commands are handled as the ASYNC packet on the IEEE 1394 bus.

DTV 220, AV-HDD 140, optical disk driver 150 and personal computer 160 can be easily removed or inserted. These devices are set independently and power-ON or power-OFF independently. When an external device is removed or inserted, a bus reset occurs. A bus reset also occurs when power is turned ON or OFF is one of these peripheral devices connected to the IEEE 1394 bus.

Upon bus reset, first the various nodes are cleared, new arbitration operation is performed and the route node IRM node is determined. This occurs so that IEEE 1394 transfers can be performed on the bus. The various nodes re-recognize the other nodes on the bus. In many cases, each node operates independently. Therefore scanning is performed for the configuration ROM and CSR contained in all of the other nodes. This causes a dramatic rise in traffic of ASYNC packets.

ISO communication must continue to be performed. ISO communication is performed by the connection of iPCR/oPCR in the EIA 61883 standard. This requires a re-start of the connection within 1 sec after a bus reset. When content-protection is performed, AKE keys need to be exchanged. If an key exchange is not performed within the prescribed time, the system generates an error in ISO communication. This results in a damaged image.

When the tuner of DTV functional part 120 records video of a broadcast in external device AV-HDD 140, personal computer 160 on the bus is in sleep mode. If a bus reset occurs, the series of processes pertaining to the transfer of the video recording data becomes dormant causing the recording of noise.

The following is an explanation of operation of communication system 101 shown in FIG. 4 according to several examples.

OPERATION EXAMPLE 3

Figure 5:
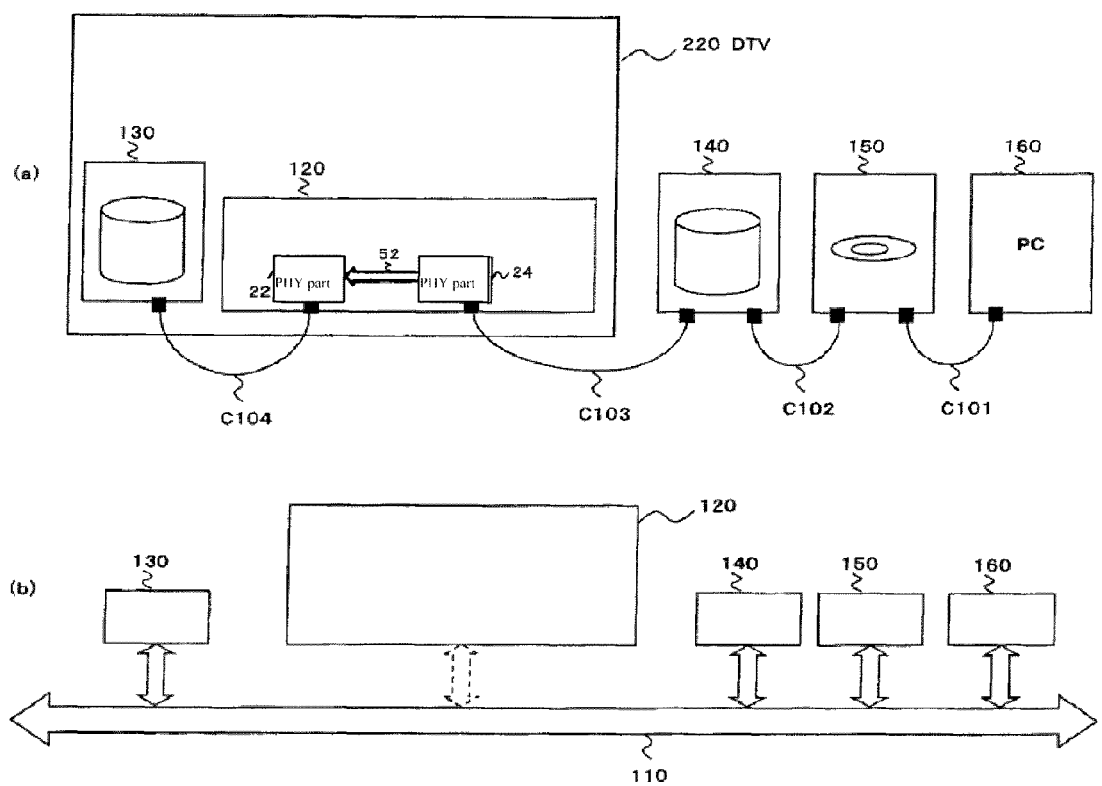
FIG. 5 illustrates an example of operation of the communication system of FIG. 4.

FIG. 5 illustrates the physical connection relationship of the cable (communication bus) according to the IEEE 1394 standard. FIG. 5 illustrates the protocol connection relationship of bus 110 of the IEEE 1394 standard according to this example. This example explains system operation when the application program for execution of CPU 60 of DTV 220 is off and the power supply of DTV 220 is turned off. In this case, CPU 60 sets PHY parts 22 and set in the PHY connected mode. PHY parts 22 and 24 are thus connected and mutual data transfer can be performed. CPU 60 puts LLC parts 32 and 34 in the off state. FIG. 5 shows that from another node connected to bus 110, DTV 120 is recognized as one node that performs the repeater operation. Data input via port 16 to PHY part 22 is output via PHY part 22, PHY bus 52 and PHY part 24 from port 18. Data input via port 18 to PHY part 24 is output via PHY part 24, PHY bus 52 and PHY part 22 from port 16.

FIG. 5 of this example shows the IEEE 1394 bus operates as bus 110 on one protocol. Therefore personal computer 160 can access AV-HDD 130 via ports 18 and 16, PHY parts 24 and 22, and PHY bus 52. When a bus reset takes place with respect to bus 110 due to an increase or decrease in the number of nodes caused by removal or insertion of nodes or turning ON or OFF a power supply, a bus reset takes place. When a bus reset occurs, all of the nodes on bus 110 output self ID packets to bus 110. As a result, the nodes on bus 10 can obtain the most recent information concerning all of the other nodes.

In this example when CPU 60 is not used in the DTV function, only the portion of the power supply for this function is turned OFF. Thus DTV 120 operates as a repeater and a peripheral device, such as personal computer 160, can access AV-HDD 130.

OPERATION EXAMPLE 4

Figure 6:
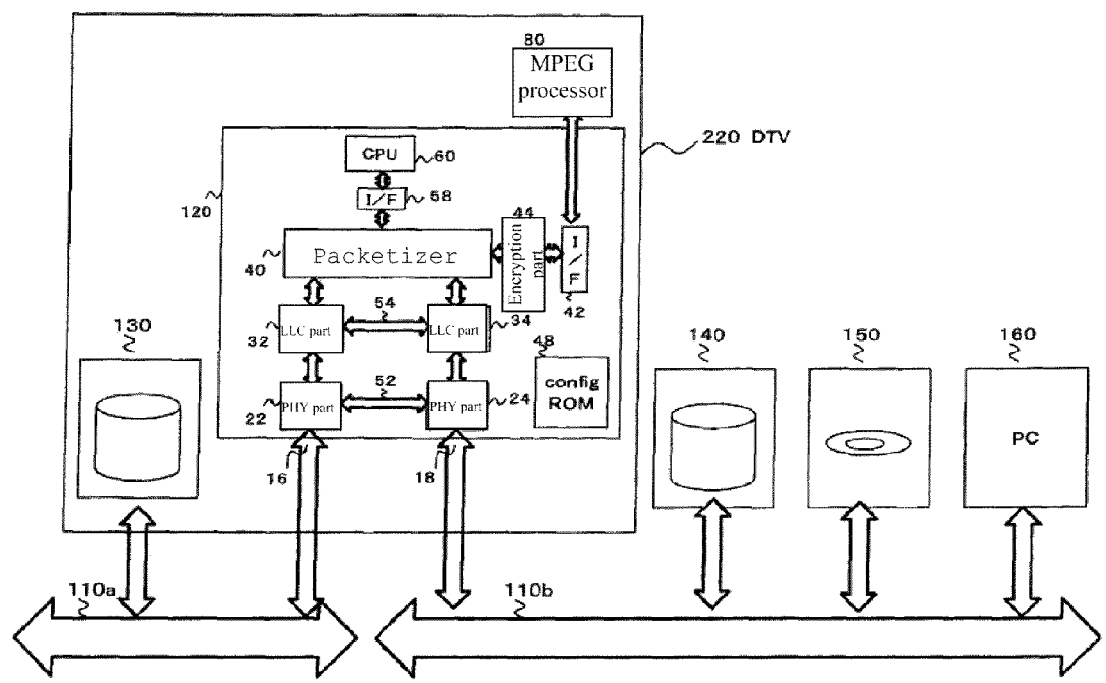
FIG. 6 illustrates another example of operation of the communication system of FIG. 4.

In this operation example, the application program executed by CPU 60 of DTV 220 will be explained. CPU 60 sets PHY parts 22 and 24 in the PHY unconnected mode. Since PHY parts 22 and 24 are in the non-connected state, no data transfers between them. FIG. 6 illustrates the IEEE 1394 bus divided via protocol into two buses 110*a* and 110*b*. Under the control of CPU 60, ports 16 and 18 can be switched between bus connection shown in FIG. 5 and bus connection shown in FIG. 6 without a physical ON/OFF. The physical connection of the various devices shown in FIG. 6 is that shown in FIG. 5.

CPU 60 sets LLC parts 32 and 34 to the ON state. DTV 120 is thus recognized as one node from among the other nodes connected to bus 110*a*. It is also recognized as one node from among the other nodes connected to bus 110*b*. After data input via port 16 from bus 110*a* to PHY part 22 is subjected to physical layer level processing in PHY part 22, the data is output to LLC part 32. LLC part 32 performs link layer level processing. The data processed in LLC part 32 is output to packetizer 40. Packetizer 40 outputs the data input from LLC part 32 to CPU 60 or to encryption part 44 via host I/F 58.

Once packetizer 40 processes data input from CPU 60 or encryption part 44 it outputs to PHY part 22. This data is subjected to link layer level processing in LLC part 32 and then output to PHY part 22. PHY part 22 physical level processes the data which is then output via port 16 to bus 110*a*.

PHY part 24 physical layer level processes data input via port 18 from bus 110*b*. PHY part 24 outputs this data are output to LLC part 34. LLC part link layer level processes this data and then outputs to packetizer 40. Packetizer 40 outputs the input data input from LLC part 34 to CPU 60 via host I/F 58 and to encryption part 44.

Then, the processed data input from CPU 60 or encryption part 44 is output by packetizer 40 to LLC part 34. After LLC part 34 link layer level processes the data, the data is output to PHY part 24, PHY part 24 physical layer level processes the data for output to bus 110*b* via port 18.

In Operation Example 2, the IEEE 1394 bus is divided via protocol into two buses, buses 110*a* and 110*b*. When a bus reset takes place with respect to bus 110*a* due to an increase or decrease in the number of nodes caused by removal or insertion of AV-HDD 140, optical disk driver 150 and personal computer 160 or the turning ON or OFF of a power supply, the bus reset signal is transmitted only within bus 110*b* and is not transmitted within bus 110*a*. Bus reset processing is performed only for the nodes connected to bus 110*b*, while no bus reset processing is performed for the nodes connected to bus 110*a*. Thus for data transferred by AKE protocol between AV-HDD 130 and DTV 120 connected to bus 110*a*, AKE is not interrupted by a bus reset on bus 110*b*.

OPERATION EXAMPLE 5

FIG. 4 illustrates PHY parts 22 and 24 are in the connected state. When CPU 60 turns ON an application program DTV 120 operates as the node at two ports connected to bus 110 via one protocol. In this example, it is possible that one of LLC parts 32 and 34 is turned ON and the other is turned OFF. Alternately, LLC parts 32 and 34 may operate as a single LLC part.

Other Embodiments

Figure 7:
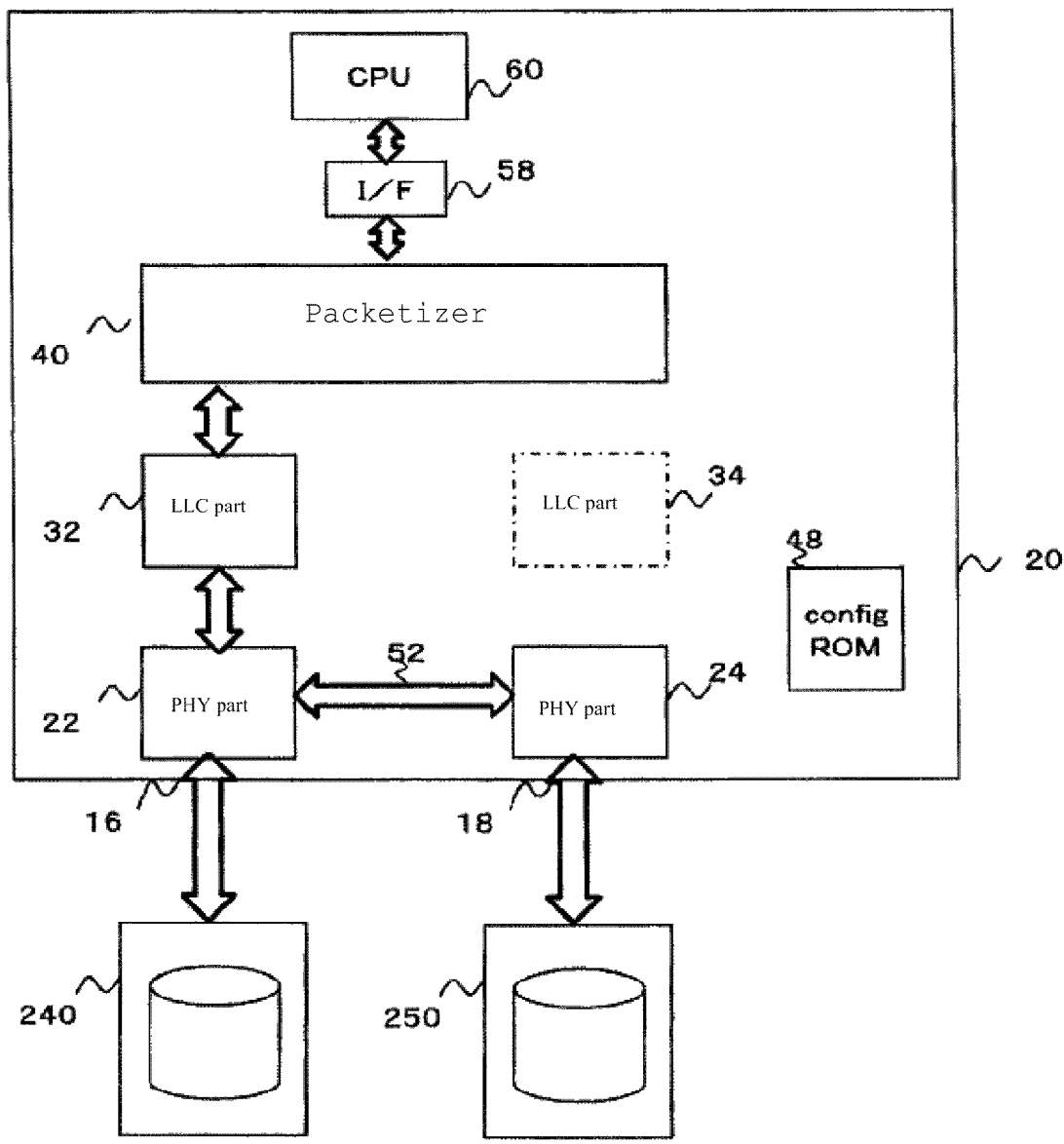
FIG. 7 is a block diagram of another application form in which the communication device shown in FIG. 1 operates as two ports.

FIG. 7 illustrates another embodiment of the state of an application when communication device 20 illustrated in FIG. 1 operates as two ports. FIG. 7 illustrates when there should be two ports connected to two peripheral devices, port 16 of communication device 20 is connected via the first cable to peripheral device 240 and port 18 is connected via the second cable to peripheral device 250. Thus communication device 20 operates as two ports.

In this example, LLC part 34 is turned off. Any link layer level processing of the upper level of PHY parts 22 and 24 is performed by LLC part 32. According to the connections shown in FIG. 7, two peripheral devices 240 and 250 can be connected to communication device 20.

Figure 8:
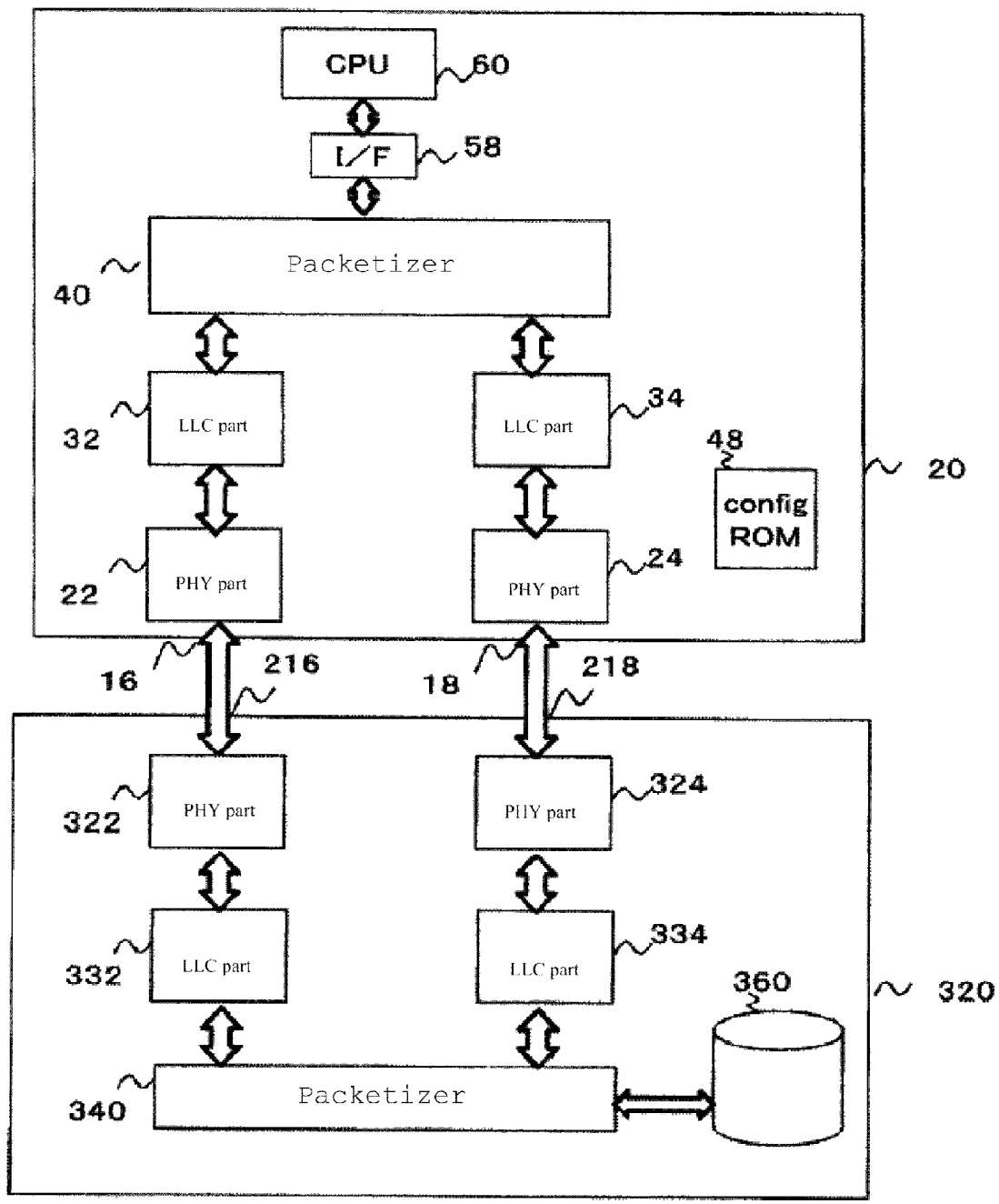
FIG. 8 is a block diagram of another application form in which the communication device shown in FIG. 1 operates as two ports.

FIG. 8 illustrates another example when the communication device shown in FIG. 1 operates as two ports. FIG. 8 illustrates PHY of communication device 20 in the unconnected mode and the LLC of communication device 20 in unconnected mode. PHY parts 22 and 24 operates individually and LLC parts 32 and 34 are made to operate individually. Communication device 20 and peripheral device 320 are physically connected by two cables using two ports each.

Port 16 of communication device 20 is connected to port 216 of peripheral device 320. Port 18 of communication device 20 is connected to port 218 of peripheral device 320. In peripheral device 320, PHY part 322 is connected to port 216 and LLC part 322 is connected to PHY part 322. PHY part 324 is connected to port 218, and LLC part 334 is connected to PHY part 324.

Communication device 20 is divided into two systems. LLC parts 32 and 34 both handle data generated in CPU 60. The data is output from ports 16 and 18 in parallel to respective ports 216 and 218 of peripheral device 320. Peripheral device 320 receives data input LLC parts 332 and 334 via packetizer 340. This data is written into memory 360.

Thus it is possible to perform data transfers at higher speeds than that when the data generated in CPU 60 are output from communications device 20 to peripheral device 320 via one set of ports.

Because host I/F 58 is between CPU 60 and packetizer 40, it is possible to use PCI express at such a high speed that the data transfer speed of data generated by CPU 60 in memory 360 depends on the data transfer speed between communication device 20 and peripheral device 320. The bus of IEEE 1394 between communication device 20 and peripheral device 320 has a bandwidth of only 800 Mbps. However, using two sets of ports for data transfer, the bandwidth can be 1.6 Gbps.

The size of communication device 20 is restricted to that of a notebook computer. FIG. 7 shows that when a port number is needed, the 2-port PHY parts operate. FIG. 8 shows that when communication device 20 requires a high data transfer rate, the PHY parts of the two ports are independently connected to the bus to transfer data in parallel. The operating modes of communication device 20 can be switched appropriately.

Plural buses may be used in parallel. Consequently, when high reliability is required for data transfers, it is possible to use the other bus to transfer the data even when one of the buses during bus multiplexing is out of order.

The present invention is not limited to the described embodiments. As long as the technical essence of the present invention is observed, one skilled in the art can perform various modifications, connections, sub-connections, as well as substitutions of the structural elements of the described embodiment. In the examples above, there are two groups of PHY parts and LLC parts in communication device 20. It is possible to provide three or more such groups. The present invention can be used in electronic devices that transfer data employing physical layers and link layers.

What is claimed is:

1. An electronic device communicating via a bus comprising:
   a first port connected to the bus;
   a second port connected to the bus;
   a first physical layer processing means connected to said first port performing physical layer processing for data input/output via said first port;
   a second physical layer processing means connected to said second port performing physical layer processing for data input/output via said second port,
   a first link layer processing means connected to said first physical layer processing means;
   a second link layer processing means connected to said second physical layer processing means;
   a storage device storing data pertaining to communication processing;
   a control means connected to said first and second physical layer processing means and said first and second link layer processing means, said control means selecting one of the following modes:

a first mode wherein said first physical layer processing means and said second physical layer processing means are connected via a first communication path, and wherein said first port, said first physical layer processing means, said second physical layer processing means and said second port operate as communication nodes on the bus on a common protocol, or a second mode wherein said first physical layer processing means and said second physical layer processing means are not connected to each other, said first physical layer processing means and said first link layer processing means operate as a first communication node on the bus in a first protocol, and said second physical layer processing means and said second link layer processing means operate as a second communication node on the bus in a second protocol;

said control means selecting said first mode or said second mode corresponding to an execution state of communication processing via the bus;

a second communication path between said first link layer processing means and said second link layer processing means;

wherein when said storage device is connected to said first port and another electronic device accessing said storage device is connected said second port, said control means selects said first mode when said communication processing is OFF and selects said second mode when said communication processing is ON; and wherein data input/output is performed via said second communication path.

2. The electronic device of claim 1, wherein:
said first mode includes
a third mode wherein both said first link layer processing means and said second link layer processing means are in an OFF state, and
a fourth mode in which a selected one of said first link layer processing means or said second link layer processing means is in said OFF state; and
wherein said control means selects either said third mode or said fourth mode upon selection of said first mode.

3. The electronic device of claim 1, further comprising:
a packet processing part connected to said first link layer processing means and second link layer processing means;
an internal communication line for connecting said first physical layer and said second physical layer; and
wherein packet data input to said first node via said first communication path is output to said second communication path via said first node, said first physical layer, said internal communication line, said second physical layer, and said second port, and said first communication path and said second communication path operate as buses on the same protocol.

* * * * *